UNITED STATES PATENT OFFICE.

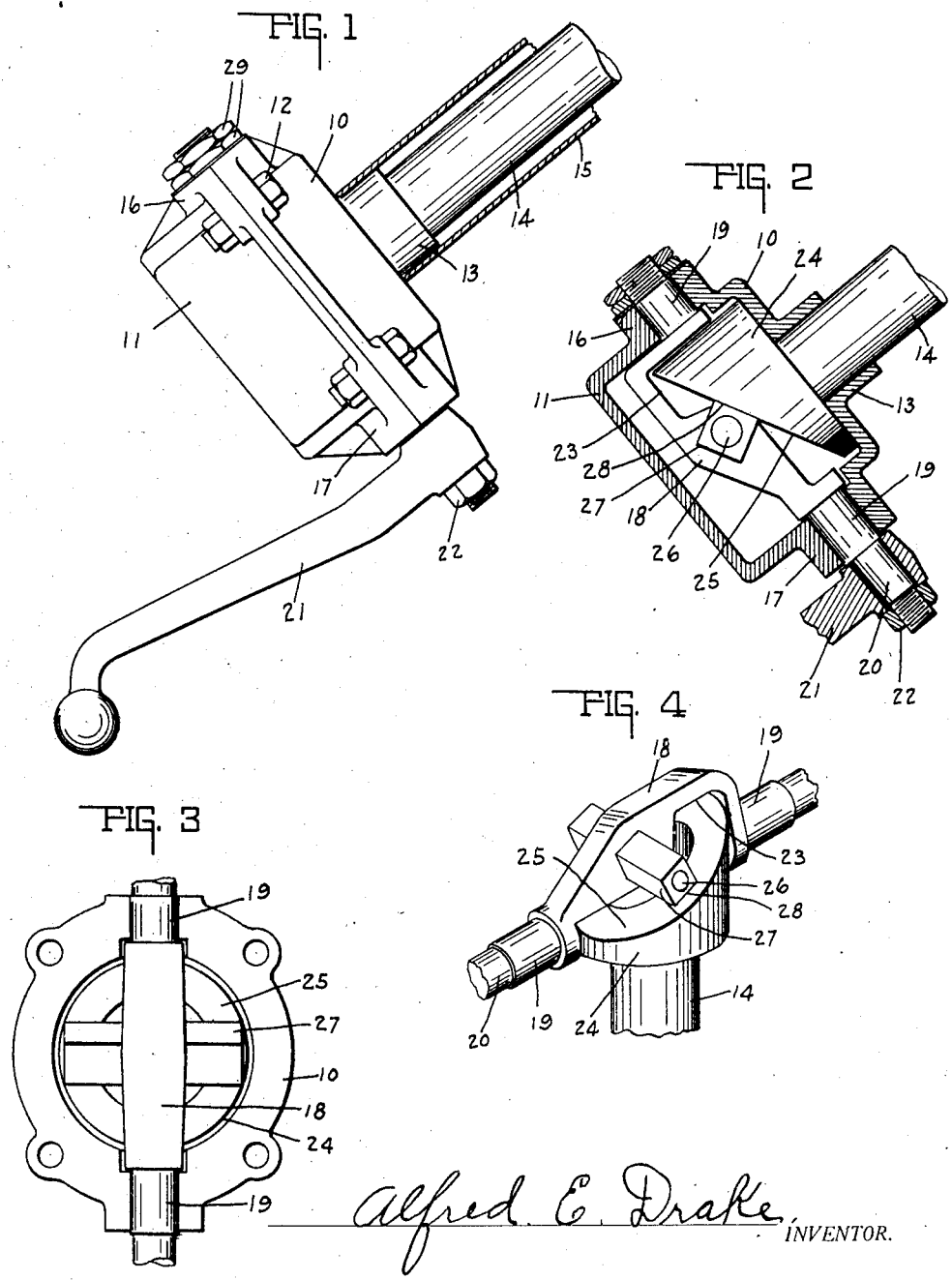

ALFRED E. DRAKE, OF INDIANAPOLIS, INDIANA, ASSIGNOR TO DRAKE MANUFACTURING COMPANY, OF INDIANAPOLIS, INDIANA, A CORPORATION.

STEERING DEVICE.

1,352,659.

Specification of Letters Patent.   Patented Sept. 14, 1920.

Application filed May 28, 1920. Serial No. 385,059.

*To all whom it may concern:*

Be it known that I, ALFRED E. DRAKE, a citizen of the United States, and a resident of Indianapolis, county of Marion, and State of Indiana, have invented a certain new and useful Steering Device; and I do hereby declare that the following is a full, clear, and exact description thereof, reference being had to the accompanying drawings, in which like numerals refer to like parts.

This invention relates to gearless motion transforming devices for power driven mechanism and the like, and is an improvement over the gearless steering device shown in Patent No. 1,290,126, dated January 7, 1919.

The chief object of this invention is to improve the stirrup or motion transforming element shown in the before mentioned patent so as to reduce the friction between the parts, increase the ease of operation, and eliminate unequal wear.

Another object of the invention is to provide the stirrup with means whereby oscillation of the supporting wheels of a motor vehicle will be prevented, so that the wheels when traveling in any position, will be maintained in the given position until such time as the steering mechanism is again operated.

The chief feature of the invention consists in providing the improved stirrup with swiveled bearing means.

Another feature of the invention consists in providing means for adjusting the stirrup within its bearings, so that the bearing means and cam surface will always be maintained in contact with each other.

The full nature of the invention will be understood from the accompanying drawings and the following description and claims.

In the drawings Figure 1 is a side view of the gearless steering mechanism and the housing therefor. Fig. 2 is a central cross sectional view of the same. Fig. 3 is a plan view of the invention showing the improved stirrup and cam. Fig. 4 is a perspective view of the cam and improved stirrup in the assembled relation.

In the drawings 10 indicates a stationary housing member and 11 a similar member, said members being stationarily secured to the power driven mechanism in any suitable or preferred manner, said complementary housing or casing members being detachably secured together by means of the bolt and nut means 12. The housing member 10 provides the usual bearing 13 for the steering column rod or post 14, said post being inclosed by the usual steering tube 15. The housing members 10 and 11 provide bearings 16 and 17, said bearings being in substantial alinement with each other, the axis thereof being at right angles to the axis of the steering rod or post.

Within the bearings 16 and 17 is oscillatably supported a stirrup member 18, said member being provided with trunnions 19 seatable in the bearings 16 and 17. One of said trunnions 19 is extended through said bearing and projects beyond the same, as at 20, and to said projecting trunnion portion is secured a steering bracket member 21, said bracket member being secured upon said portion 20 by suitable means, such as the nut 22.

The stirrup 18, as shown clearly in Figs. 2 and 4, is provided with an intermediate portion which is offset from said trunnions. The stirrup is also cut away at 23 to provide clearance for the cylindrical cam member 24 rotatable by and with the steering rod or post 14. The cylindrical cam member has an inclined face providing the obliquely disposed cam surface 25. Extending transversely of the trunnion axis and upon opposite sides of the intermediate stirrup portion is a pair of alined stub shafts or pivots 26, upon which are swiveled or pivotally mounted suitable bearing members 27, which may be rollers or the like, but in the present instance are shown in the form of blocks providing a flat surface 28 adapted to engage the inclined cam surface 25. By increasing the amount of surface between the members 28 and 25 to a moderate bearing surface, greater ease of operation is obtained, since unequal wear of the parts is eliminated.

While the stub shafts 26 are herein shown stationarily secured upon the stirrup 18 by being formed integral therewith, it will be understood that a single shaft may extend through the stirrup 17 and be stationarily or rotatably mounted therein and carry upon its outer ends suitable swiveled bearing members of the block, roller or other preferred type.

The opposite trunnion 19 also projects beyond the bearing 16 and the extension is suitably threaded to receive a plurality of nuts 29, whereby the stirrup can be adjusted longitudinally of the axis and the bearings. Thus, the bearing members 28 may always be maintained in contact with the cam surface 25.

While the invention is an improvement upon the device shown in the before mentioned patent, it will be understood that various modifications of the present invention may be made without departing from the scope thereof, some of which have been suggested in the foregoing specification. Throughout the specification and claims, the words rotatable, oscillatable, swiveled and pivotal are used interchangeably.

The invention claimed is:

1. In a mechanism, a housing, a rotatable cam member having a cam surface obliquely disposed to the axis of rotation, a stirrup oscillatably supported by said housing, bearing means upon said stirrup, and means associated with said housing and said stirrup for maintaining said bearing means in engagement with said cam surface.

2. In a mechanism, a housing, a rotatable cam member having a cam surface obliquely disposed to the axis of rotation, a stirrup oscillatably supported by said housing bearing, means upon said stirrup, and means associated with said housing for adjusting said stirrup longitudinally of the stirrup axis for maintaining said bearing means in engagement with said cam surface.

3. In a mechanism, a housing providing bearings, a rotatable cam surface obliquely disposed to the axis of rotation having a cam surface, a stirrup oscillatably supported in said housing bearings, bearing means swiveled upon said stirrup, and means associated with said housing and stirrup for adjusting said stirrup longitudinally of the stirrup bearings to maintain said swiveled bearing means in engagement with said cam surface.

4. In a mechanism, a rotatable cam having a cam surface obliquely disposed to the axis of rotation, an oscillatably supported stirrup straddling said cam, and a pair of bearing means extending transversely of the stirrup each including a flat surface for engagement with said cam surface, each of said bearing means being swiveled and positioned upon opposite sides of the stirrup.

In witness whereof I have hereunto affixed my signature.

ALFRED E. DRAKE.